(12) United States Patent
O'Donnell et al.

(10) Patent No.: US 7,711,160 B2
(45) Date of Patent: May 4, 2010

(54) AUTOMATIC OPTIMAL VIEW DETERMINATION FOR CARDIAC ACQUISITIONS

(75) Inventors: Thomas O'Donnell, New York, NY (US); Brett Cowan, Auckland (NZ); Alistair Young, Auckland (NZ)

(73) Assignee: Siemens Medical Solutions USA, Inc., Malvern, PA (US)

( * ) Notice: Subject to any disclaimer, the term of this patent is extended or adjusted under 35 U.S.C. 154(b) by 554 days.

(21) Appl. No.: 10/852,834

(22) Filed: May 25, 2004

(65) Prior Publication Data

US 2005/0033143 A1 Feb. 10, 2005

Related U.S. Application Data

(60) Provisional application No. 60/473,730, filed on May 28, 2003.

(51) Int. Cl.
*G06K 9/00* (2006.01)
(52) U.S. Cl. ...................... 382/128; 600/425
(58) Field of Classification Search .......... 128/659, 128/653.1, 656; 382/128–132, 199; 378/98.2; 250/369; 600/425, 436
See application file for complete search history.

(56) References Cited

U.S. PATENT DOCUMENTS

| 5,107,838 | A | 4/1992 | Yamaguchi | 128/653 |
|---|---|---|---|---|
| 5,421,331 | A | 6/1995 | Devito et al. | 128/659 |
| 5,680,471 | A | 10/1997 | Kanebako et al. | 382/128 |
| 6,295,464 | B1 * | 9/2001 | Metaxas | 600/407 |
| 6,708,055 | B2 * | 3/2004 | Geiser et al. | 600/425 |
| 2002/0151793 | A1 | 10/2002 | Geiser et al. | 600/450 |

OTHER PUBLICATIONS

Eiho et al., "3-D heart image reconstructed from MRI data", Nov. 14-17, 1988, IEEE, vol. 2, pp. 1198-1201.*
Soraghan et al., "Cardiac Left Ventricular Volume Changes Assessment by Long Axis Echocardiographical Image Processing", Jul. 14-17, 1997, vol. 1, pp. 361-365.*
Mullick R et al: "Automatic Determination of LV Orientation From Spect Data" IEEE Transactions on Medical Imaging, IEEE Inc.. New York, US, vol. 14, No. 1, Mar. 1, 1995, ISSN: 0278-0062 the whole document.
Jackson et al., "Automatic Planning of the Acquisition of Cardiac MR Images", Medical Image Computing and Computer Assisted Intervention (MICCAI) 2003, pp. 541-548.

* cited by examiner

*Primary Examiner*—Brian Casler
*Assistant Examiner*—Elmer Chao
(74) *Attorney, Agent, or Firm*—Donald B. Paschburg; F. Chau & Associates, LLC

(57) ABSTRACT

A method, system, and apparatus of determining optimal viewing planes for cardiac image acquisition, wherein the method includes acquiring a set of sagittal, axial, and coronal images of a heart, where the axial and coronal images intersect with the sagittal image orthogonally, and where the heart has a natural axis and a left ventricle ("LV") with a bloodpool, a bloodpool border, and an apex. The method also includes making a map of the bloodpool border, and using the map to create a full coordinate frame oriented along the natural axis.

7 Claims, 8 Drawing Sheets

AUTOMATIC OPTIMAL VIEW DETERMINATION FOR CARDIAC ACQUISITIONS

CROSS-REFERENCE TO RELATED APPLICATION

This application claims the benefit of U.S. Provisional Application Ser. No. 60/473,730, filed on 28 May 2003 and entitled "Automatic Optimal View Determination for Cardiac Acquisitions", which is incorporated herein by reference in its entirety.

BACKGROUND OF INVENTION

1. Technical Field

The present invention relates to medical imaging, and more particularly, to determining the short and long axis viewing planes for cardiac image acquisitions.

2. Discussion of the Related Art

In the field of medical imaging, images oriented around the short and long axis normals of the heart are the standard format for evaluation by clinicians. The orientation of the heart, and therefore its short and long axis normals, are unique to individuals. Thus, in acquiring such images, the orientation of the individual's heart and its associated coordinate frame (short axis, long axis, and the direction orthogonal to both) need to be determined.

In related art, an average Left Ventricular coordinate system is computed from a database of 50 subjects and used as a starting point. From this initial short axis orientation, several short axis images are sampled. Then the Expectation-Maximization algorithm is used to segment the left and right ventricles in these images. The centroids of the Left Ventricle ("LV") are found in the short axis image stack. These are connected to form the final short axis normal. Then the Right Ventricular point farthest from this axis is found and used to determine the long-axis normal direction. Since ventricular shapes can vary, some even being banana-shaped, this method does not always yield an appropriate coordinate frame.

SUMMARY OF THE INVENTION

An exemplary embodiment of the present invention includes a method of determining optimal viewing planes for a cardiac image acquisition. The method includes acquiring a set of sagittal, axial, and coronal images of a heart, where the axial and coronal images intersect with the sagittal image orthogonally, and where the heart has a natural axis and a left ventricle ("LV") with a bloodpool, a bloodpool border, and an apex. The method also includes making a map of the bloodpool border, and using the map to create a full coordinate frame oriented along the natural axis.

Another exemplary embodiment of the present invention includes a system for determining optimal viewing planes for cardiac image acquisition. The system comprising a processor and an imaging adapter in signal communication with the processor for receiving images of a heart, where the heart has a natural axis and a left ventricle ("LV") with a bloodpool, and a bloodpool border. The system also comprising a mapping unit in signal communication with the processor for mapping the bloodpool border. The system also comprising a creation unit in signal communication with the processor for creating a full coordinate frame oriented with the natural and a user interface in signal communication with the processor for receiving controlling input from user.

DETAILED DESCRIPTION OF PREFERRED EMBODIMENTS

Exemplary embodiments of the present invention provide methods, systems, and apparatus for determining the optimal short axis and long axis viewing planes for cardiac image acquisitions. The images can be acquired using: a Magnetic Resonance Scanner ("MR"), a Positron Emission Tomography Scanner ("PET"), a Single Photon Emission Computed Tomography ("SPECT"), a Computed Tomography Scanner ("CT"), and other medical imaging devices. CT, SPECT, and PET volume data of a heart, among other data sources representative of a heart, can be reformatted, subsequent to acquisition, to create the desired images as well. After the optimal viewing planes have been determined, the images can be rescanned or the data, like that of CT volumes, can be reformatted to acquire new images at the new viewing planes.

Figure 1:
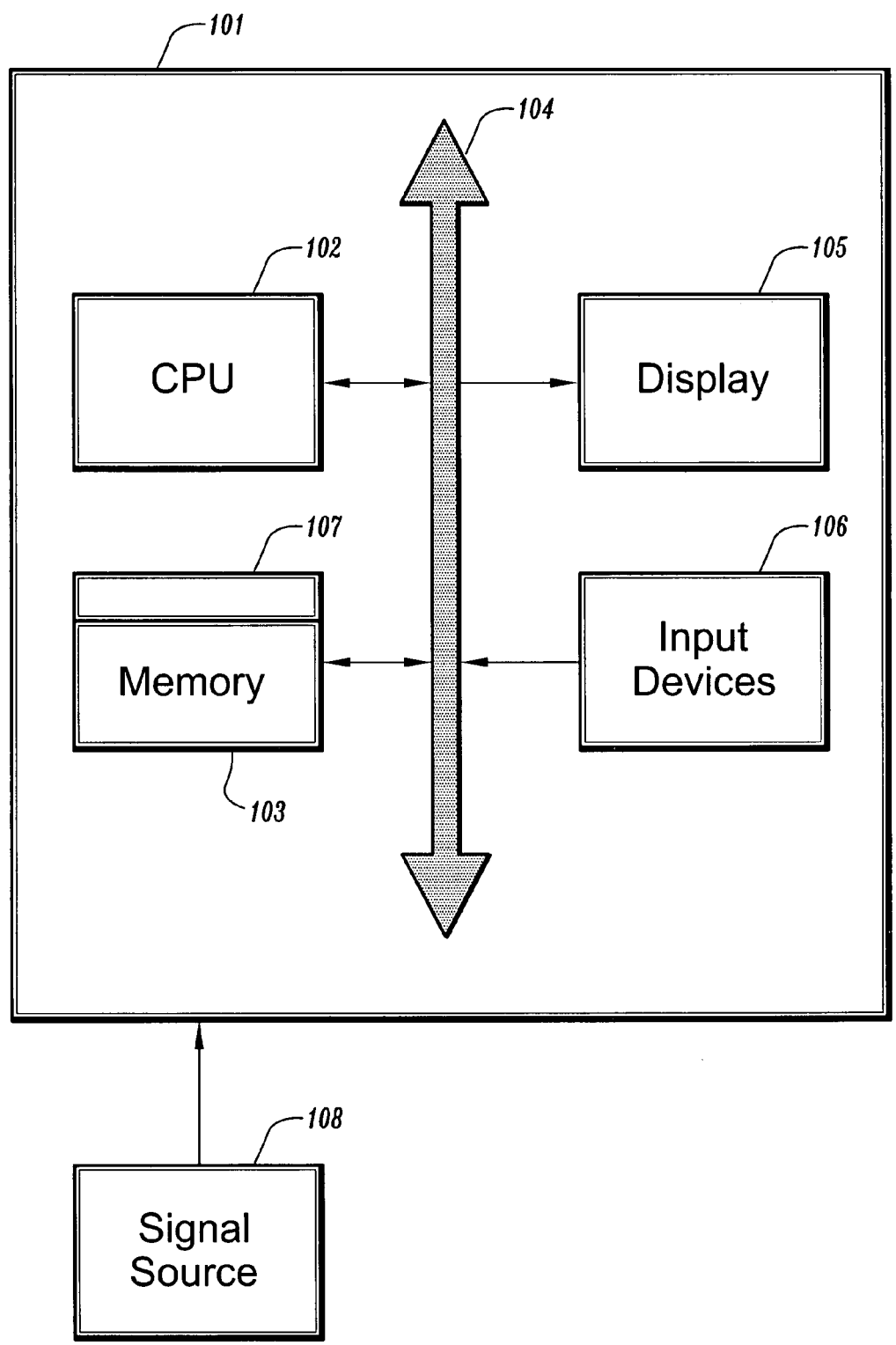
FIG. 1 is a schematic diagram showing an exemplary embodiment of a computer system.

Referring to FIG. 1, according to an exemplary embodiment of the present invention, a computer system 101 for implementing the present invention includes a central processing unit ("CPU") 102, a memory 103 and an input/output ("I/O") interface 104. The computer system 101 is generally coupled through the I/O interface 104 to a display 105 and various input devices 106 such as a mouse, keyboard, and medical imaging devices. The support circuits can include circuits such as cache, power supplies, clock circuits, and a communications bus. The memory 103 can include random access memory ("RAM"), read only memory ("ROM"), disk drive, tape drive, etc., or a combination thereof. The present invention can be implemented as a routine 107 that is stored in memory 103 and executed by the CPU 102 to process the signal from the signal source 108. As such, the computer system 101 is a general-purpose computer system that becomes a specific purpose computer system when executing the routine 107 of the present invention.

The computer system 101 also includes an operating system and microinstruction code. The various processes and functions described herein may either be part of the microinstruction code or part of the application program (or a combination thereof), which is executed via the operating system. In addition, various other peripheral devices may be connected to the computer platform, such as an additional data storage device and a printing device.

Figure 2:
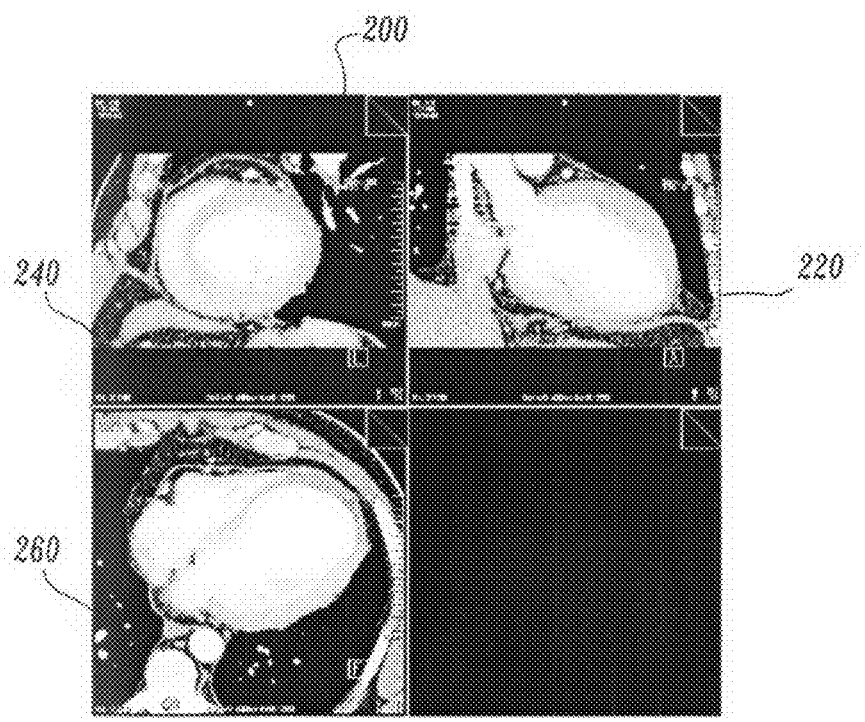
FIG. 2 is a medical image depicting a set of three CT images of the heart acquired from orthogonal orientations.

FIG. 2 is a medical image depicting a set of three CT images of the heart acquired from orthogonal orientations indicated generally by reference numeral 200. These images were reformatted from the same CT Volume data set that is representative of a heart. Reference numeral 220 points to a coronal image of the heart. Reference numeral 240 points to a sagittal view of the heart. Reference numeral 260 points to an axial view of the heart.

Figure 3:
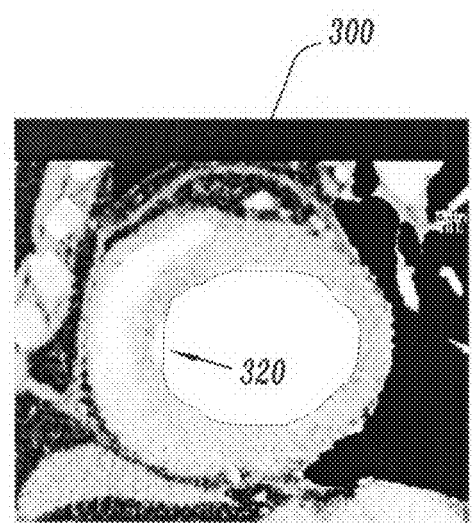
FIG. 3 is a medical image depicting a sagittal view of a heart with the LV bloodpool identified.

FIG. 3 is a medical image depicting the sagittal view of the heart with the LV bloodpool identified, indicated generally by reference numeral 300. This image 300 is the same sagittal view 240 pictured in FIG. 2. Here reference numeral 320 points to the identified LV bloodpool.

Figure 4:
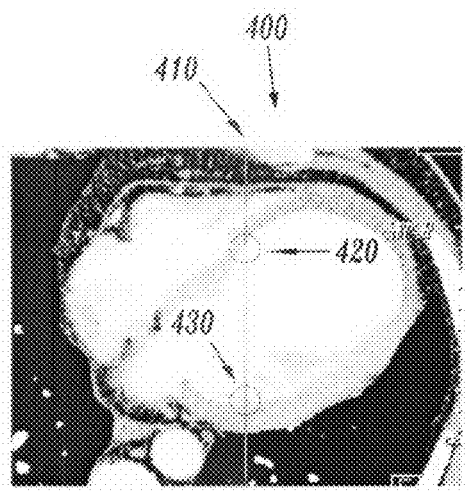
FIG. 4 is a medical image depicting an exemplary embodiment of locating bloodpool borders in an axial view of a heart.

FIG. 4 is a medical image depicting an exemplary embodiment of locating bloodpool borders in the axial view 260 from FIG. 2, indicated generally by reference numeral 400. Reference numeral 410 indicates the line where this image plane intersects with the sagittal image plane shown in FIG. 3. Reference numerals 420 and 430 indicate the identified locations on the bloodpool border that intersect the sagittal image plane.

Figure 5:
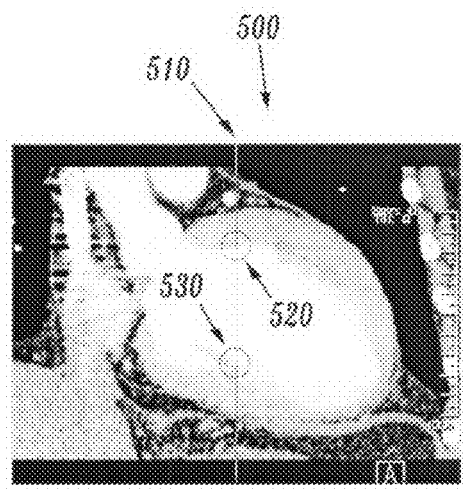
FIG. 5 is a medical image depicting a an exemplary embodiment of locating bloodpool borders in a coronal image of a heart.

FIG. 5 is a medical image depicting a an exemplary embodiment of locating bloodpool borders in the coronal image 220 from FIG. 2, indicated generally by reference numeral 500. Reference numeral 510 indicates the line where this image plane intersects with the sagittal image plane shown in FIG. 3. Reference numerals 520 and 530 indicate the identified locations on the bloodpool border that intersect the sagittal image plane.

Figure 6:
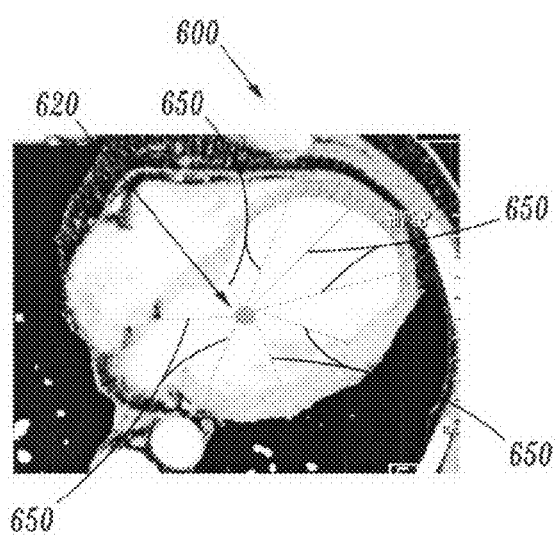
FIG. 6 is a medical image depicting an exemplary embodiment of mapping points on the bloodpool border.

FIG. 6 is a medical image depicting an exemplary embodiment of mapping points on the bloodpool border, indicated generally by reference numeral 600. The image depicted here is the same as the axial view shown in FIG. 4. Reference numeral 620 indicates the midpoint between the blood pool border locations 420 and 430 shown in FIG. 4. The lines identified by reference numeral 650 indicates the different points along the bloodpool border, mapped radially from the midpoint 620.

Figure 7:
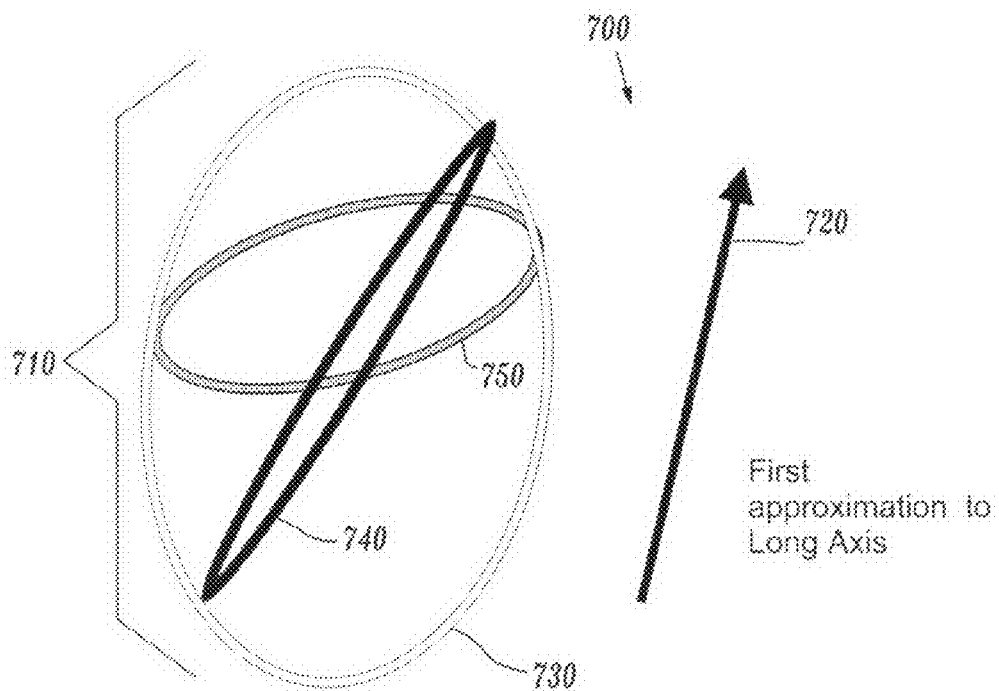
FIG. 7 is a graphical diagram of an ellipsoid that approximates the three dimensional LV bloodpool border of a heart with the short axis normal orientation identified.

FIG. 7 is a graphical diagram of an ellipsoid that approximates the three dimensional LV bloodpool border of a heart with the short axis normal orientation identified, indicated generally by reference numeral 700. The borders of the bloodpool mapped earlier, indicated by reference numerals 730, 740, and 750, form an ellipsoid-like object in space. This ellipsoid, indicated by reference numeral 710, is used to determine the approximate short axis normal, 720, of the heart.

Figure 8:
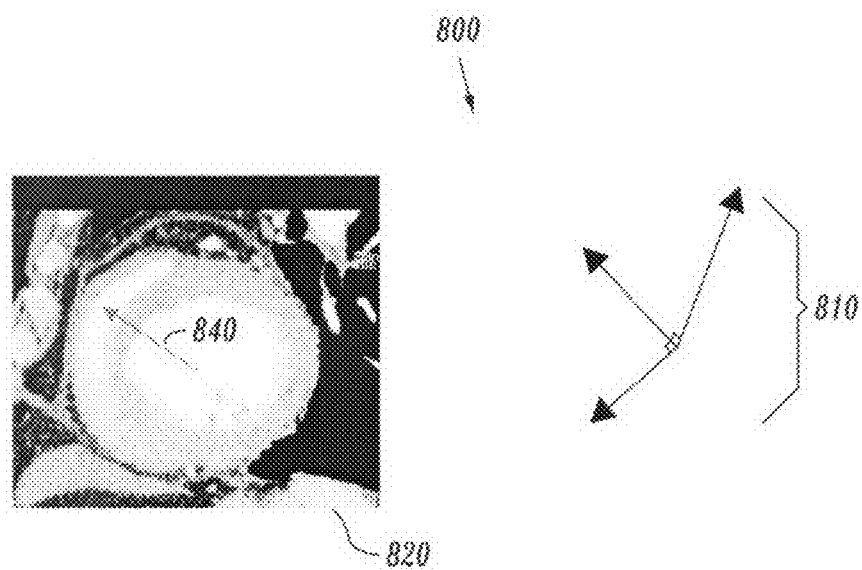
FIG. 8 is a medical image depicting a sagittal image of a heart with the septal direction being indicated and a full coordinate frame oriented with respect to the heart's natural axis.

FIG. 8 is a medical image depicting a sagittal image of a heart with the septal direction being indicated and a full coordinate frame oriented with respect to the heart's natural axis, indicated generally by reference numeral 800. Here reference numeral 820 is pointing to the sagittal image of the heart from FIG. 2. The septal direction has an intensity profile of bright→dark→bright pointing out from the center of the bloodpool in the sagittal image 820. The arrow, indicated by reference numeral 840, is the septal direction and has just such a profile. Reference numeral 810 points to a full coordinate frame oriented along the heart's natural axis. It was created using the short axis normal 720 and the septal direction 840 in a process an embodiment of which is described below.

Figure 9:
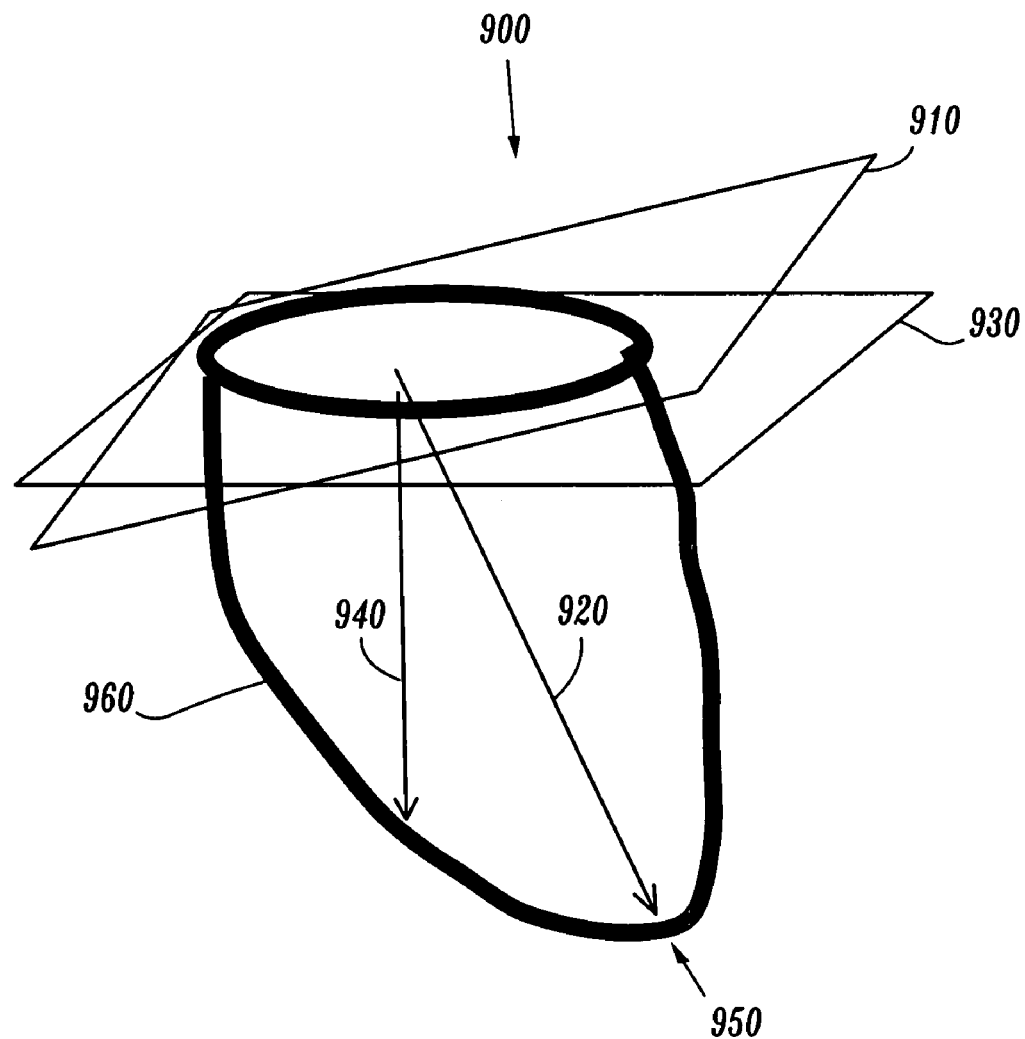
FIG. 9 is a graphical diagram depicting an exemplary representation of a left ventricle and a set of short axial images.

FIG. 9 is a graphical diagram depicting an exemplary representation of a left ventricle and a set of short axial images, indicated generally by reference numeral 900. Reference numeral 960 is pointing to a representation of the left ventricle of a heart with reference numeral 950 indicating its apex. Reference numerals 910 and 930 indicate two candidate short axis plains, with reference numerals 920 and 940, respectively, indicating their associated normals.

Figure 10:
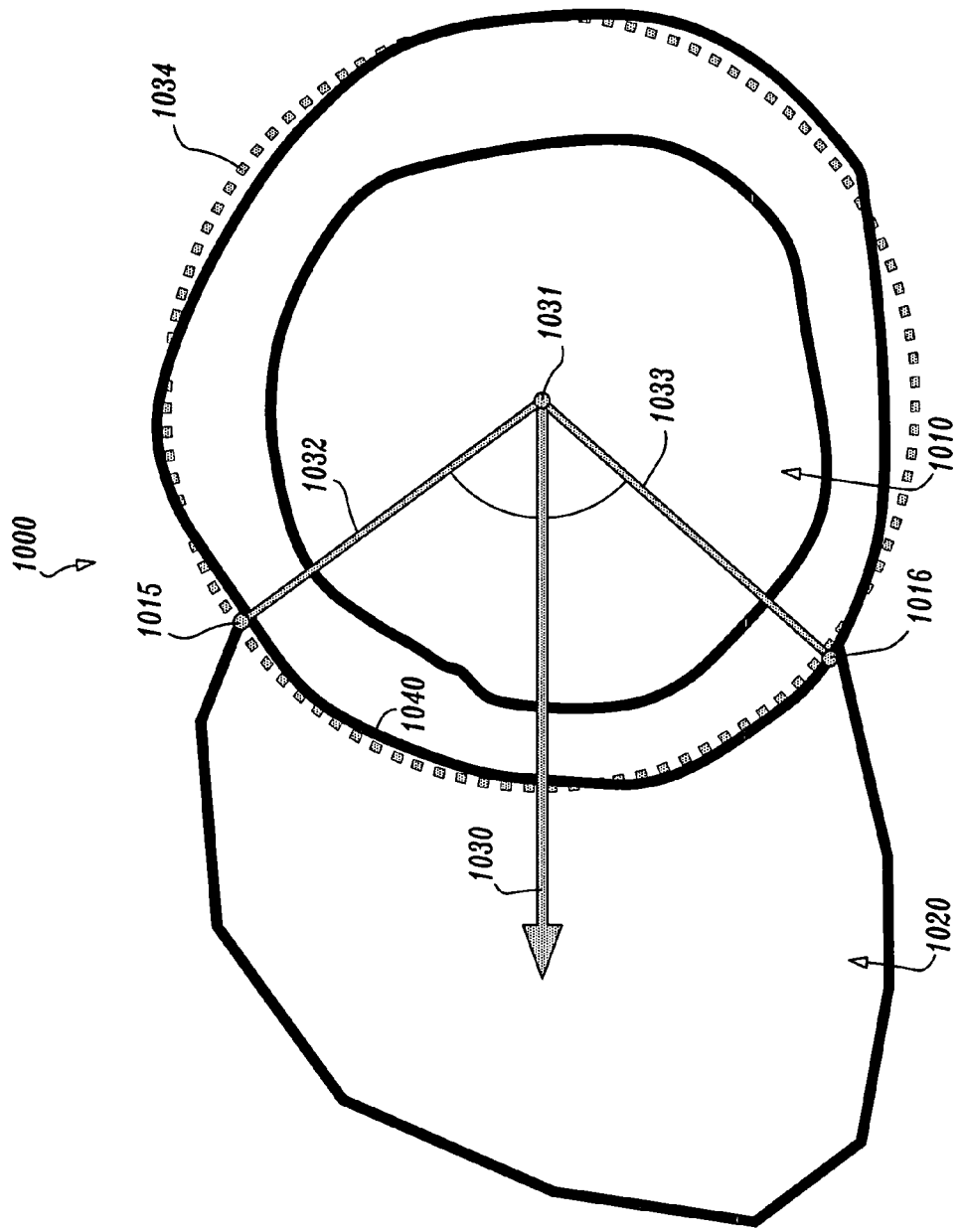
FIG. 10 is a graphical diagram depicting an exemplary embodiment of the current invention and depicts how the long axis normal orientation can be determined from an short axial image of a heart.

FIG. 10 is a graphical diagram depicting an exemplary embodiment of the current invention indicated generally by reference numeral 1000. It depicts how the long axis normal orientation can be determined from a short axial image of a heart, The FIG. 1000 is a representation of a short axial view of the heart. The left ventricle and its associated bloodpool is indicated by reference numeral 1010, the right ventricle and its associated bloodpool is indicated by reference numeral 1020, and the septum between them is indicated by reference numeral 1040. In this short axis image the insertion points, 1015 and 1016, of the LV 1010 are identified. These insertion points, 1015 and 1016, are where the LV 1010 meets the septum. Any number of methods may be used to identify these points including the intensity profile change (where bright→dark→bright ceases) detection method mentioned earlier. Reference numeral 1031 represents the center of the LV bloodpool 1010. Its location can be computed by automatically segmenting the bloodpool border and finding the centroid of that border. A circle 1034 is fit to these three points, 1015, 1016, and 1031, with the center of the circle fit to the center 1031 of the bloodpool 1010. The angle formed by the lines, 1032 and 1033, connecting the center 1031 of the circle to the insertion points 1015 and 1016 is bisected. This direction is the septal direction and forms the long-axis normal 1030.

Figure 11:
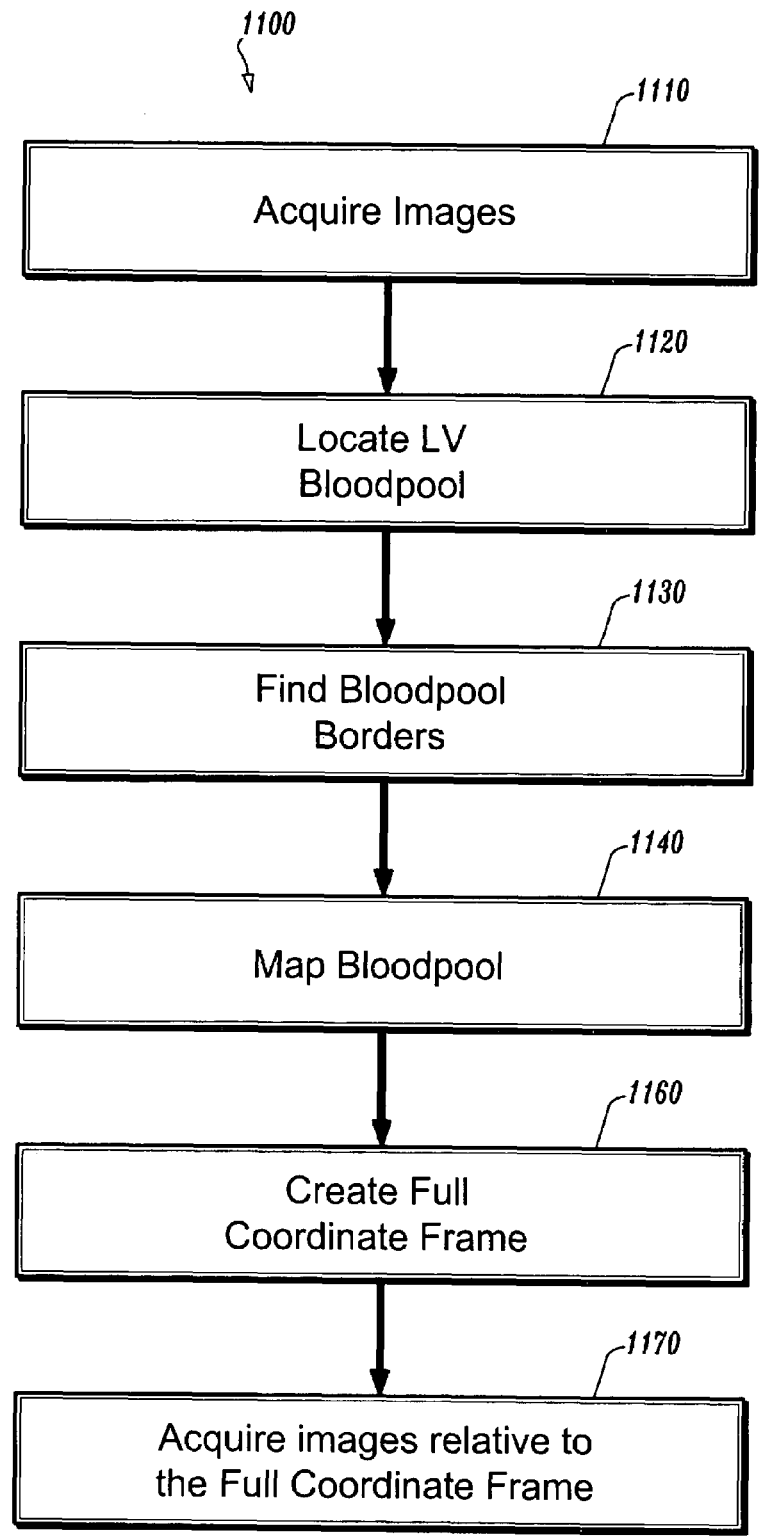
FIG. 11 is a flow diagram depicting an exemplary embodiment of the current invention.

FIG. 11 is a flow diagram that depicts an exemplary embodiment of the current invention, and is indicated generally by reference numeral 1100. Block 1110 represents the step of acquiring of sets of axial, sagittal, and coronal images (3 to 6 images per set) of a heart. These images should include, at least in part, the Left Ventricle. Examples of these images are shown in FIG. 2. These images may be acquired using a medical imaging scanner as described earlier or by reformatting data representative of the heart in canonical directions as is done with CT volumes.

Block 1120 depicts the step of locating the Left Ventricle ("LV") bloodpool of the heart within the sagittal images. An exemplary embodiment of this step is depicted in FIG. 3. A number of algorithms may be used to locate the blood pool border, including any number of automatic segmentation algorithms. The results need not be precise.

Block 1130 represents the step of locating where the bloodpool borders within the images orthogonal to the sagittal image planes. FIGS. 4 and 5 depict an exemplary embodiment of how this can be done. These reference points are simple to locate, even in the event of misregistration. An exemplary embodiment of a method used to accomplish this is performing a simple intensity analysis along the line (410 and 510) where the sagittal image intersects the image being analyzed.

Block 1140 represents the step of mapping the bloodpool border of the LV. Points on the blood pool border are located radially from the midpoint of the locations found above (420, 430, 520, 530). FIG. 6 depicts an exemplary embodiment of this step, where the bloodpool of the axial view is mapped.

Any number of methods maybe used to accomplish this mapping. These methods include, among others: detecting a change in the intensity profile of the line from the midpoint toward the LV border, principle component analysis, ellipsoid robust fit, or the fitting of any 2-D model that approximates the long axis cross-section of the left ventricle.

Block 1160 represents the step of creating a full coordinate frame relative to the heart being imaged. The full coordinate frame is created by defining a long axis normal and a short axis normal oriented with respect to the heart. Both of these directions are orthogonal to each other and the third axis needed to define a full coordinate frame. Thus, by defining the short axis normal orientation and the long axis normal orientation a full coordinate frame is defined.

In an exemplary embodiment of the present invention this is accomplished by finding the long axis, also known as the short axis normal, orientation of the heart. FIG. 7 depicts an exemplary method that ban be used to find the short axis normal. A number of different methods can be used to analyze the ellipsoid 710 accomplish this, including principle component analysis. The direction of the short axis of the heart, also known as the long axis normal, needs to be found. This can be accomplished by finding the septal direction in a sagittal or a short axis image of the heart, as the septal direction approximates the long axis normal direction of the heart. FIG. 8 depicts an exemplary embodiment of this step. Thus, arrow 840 approximates the direction of the long axis normal. As the short axis normal and long axis normal are orthogonal to each other, a full coordinate frame, 810, can be created and oriented properly in relation to the heart.

In another exemplary embodiment of the current invention, the full coordinate frame orientation can be further refined. This is accomplished by tweaking the coordinate frame through several different orientations, acquiring short axial and long axial images with each adjustment. The optimal full coordinate frame is the orientation associated with the images that best captures the apex. The images that best capture the apex will be the image that has the longest apex to mitral valve plane distance.

In another exemplary embodiment of the present invention the short axis normal orientation can is refined before calculating the long axis normal direction. This refinement is accomplished by tweaking the short axis normal orientation, acquiring at least one image at each orientation, and measuring the distance from the short axis plane to the apex of the LV in the image. An exemplary embodiment of this process is represented in FIG. 9. The short axis normal, which has the longest distance to the apex, is selected as the best one. Thus in this case normal 920 is the longest and represents the best short access normal orientation.

In another exemplary embodiment of the present invention the long access normal orientation is calculated using a sagittal or short axial view of the left ventricle. In this case the septal direction is used to calculate the long axis normal orientation. The sagittal or short axial image used for the analysis can be either an existing or newly acquired image. FIG. 10 illustrates how this can be accomplished for a short axial image. A similar method can be used for a sagittal image as well. With both the short axis normal and long axis normal orientations the full coordinate frame can be defined. As the short axis and long axis are orthogonal to each other, a full coordinate frame oriented with respect to the heart's natural axis is now created.

Block 1170 depicts the step of acquiring new images of the heart, respective to the full coordinate frame that has been defined. These include, but are not limited to, the short and long axis views. These images can be the results of new scans of a heart, for example new MR Scans, or reformatted from data representing the heart, for example CT slices.

Figure 12:
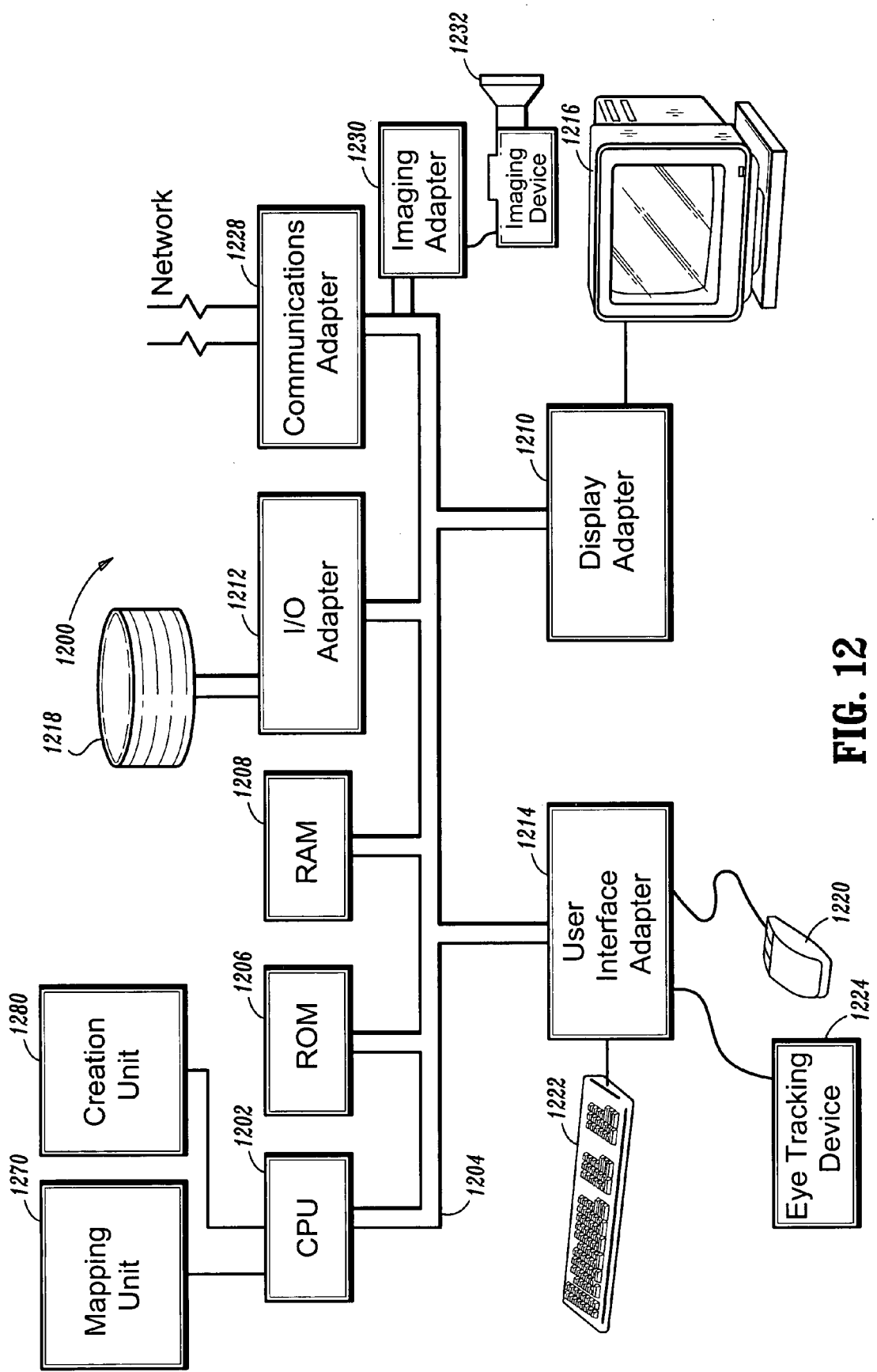
FIG. 12 is schematic diagram of an exemplary embodiment of a system for automatic optimal view determination for cardiac acquisitions.

FIG. 12 is schematic diagram of an exemplary embodiment of a system for automatic optimal view determination for cardiac acquisitions, indicated generally by reference numeral 1200. The system 1200 includes at least one processor or central processing unit ("CPU") 1202 in signal communication with a system bus 1204. A read only memory ("ROM") 1206, a random access memory ("RAM") 1208, a display adapter 1210, an I/O adapter 1212, a user interface adapter 1214, a communications adapter 1228, and an imaging adapter 1230 are also in signal communication with the system bus 1204. A display unit 1216 is in signal communication with the system bus 1204 via the display adapter 1210. A disk storage unit 1218, such as, for example, a magnetic or optical disk storage unit is in signal communication with the system bus 1204 via the I/O adapter 1212. A mouse 1220, a keyboard 1222, and an eye tracking device 1224 are in signal communication with the system bus 1204 via the user interface adapter 1214. An imaging device 1232 is in signal communication with the system bus 1204 via the imaging adapter 1230. The imaging device 1232 may be a medical imaging device, as a MR Scanner. The imaging device 1232 can also be a device for acquiring and reformatting data representative of a heart, such as the data from CT Volumes.

A mapping unit 1270 and a creation unit 1280 are also included in the system 1200 and in signal communication with the CPU 1202 and the system bus 1204. While the modeling unit 1270 and the creation unit 1280 are illustrated as coupled to the at least one processor or CPU 1202, these components are preferably embodied in computer program code stored in at least one of the memories 1206, 1208 and 1218, wherein the computer program code is executed by the CPU 1202. As will be recognized by those of ordinary skill in the pertinent art based on the teachings herein, alternate embodiments are possible, such as, for example, embodying some or all of the computer program code in registers located on the processor chip 1202. Given the teachings of the disclosure provided herein, those of ordinary skill in the pertinent art will contemplate various alternate configurations and implementations of the modeling unit 1270 and the creation unit 1280, as well as the other elements of the system 1200, while practicing within the cope and spirit of the present disclosure.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

It should also be understood that the above description is only representative of illustrative embodiments. For the convenience of the reader, the above description has focused on a representative sample of possible embodiments, that are illustrative of the principles of the invention, and has not attempted to exhaustively enumerate all possible variations. That alternative embodiments may not have been presented for a specific portion of the invention is not to be considered a disclaimer of those alternate embodiments. Other applications and embodiments can be straightforwardly implemented without departing from the spirit and scope of the present invention. It is therefore intended, that the invention not be limited to the specifically described embodiments, but the invention is to be defined in accordance with that claims that follow. It can be appreciated that many of those undescribed embodiments are within the literal scope of the following claims, and that others are equivalent.

What is claimed is:

1. A computer implemented method of determining optimal viewing planes for a cardiac image acquisition, the method comprising:

acquiring a set of sagittal, axial, and coronal images reformatted from a 3-dimensional image of a heart, said axial, coronal and sagittal images orthogonally intersecting with each other, each said image comprising a plurality of intensities defined on a 2-dimensional grid of points;

segmenting a blood pool from said sagittal heart images;

locating a line where each of said axial and coronal images intersects said sagittal image and analyzing an intensity along said intersection line to find border points of said blood pool in each said intersection line;

locating points on said blood pool borders that are radially mapped from a mid-point of each said intersection line;

fitting an ellipsoid to said blood pool border points that approximates a 3-dimensional left-ventricle (LV) blood-pool border;

analyzing said ellipsoid to find a long axis orientation of said heart;

finding a short axis direction of the heart by finding the septal direction in a sagittal or a short axis image of the heart by finding a center of the LV bloodpool in said image, finding insertion points where said LV meets said septum, forming an angle using the two insertion points and the bloodpool center, the angle having a vertex at the bloodpool center, bisecting the angle, and determining the septal direction as the direction of the bisection, wherein said long axis and said short axis define an optimal viewing plane that determines a third axis normal to said long and short axes, said long, short and third axes forming a full natural coordinate frame for said heart, and acquiring one or more new images of the heart with respect to said full natural coordinate frame of said heart, wherein said steps of acquiring a set of images, segmenting a blood pool, locating a line, locating points, fitting an ellipsoid, analyzing said ellipsoid, finding a short axis direction of the heart, and acquiring one or more new images are performed by a computer processor.

2. The method of claim 1, further comprising refining said full coordinate frame orientation by tweaking the coordinate frame through several different orientations, acquiring short axial and long axial images with each adjustment, and finding an image having a longest apex to mitral valve plane distance, wherein an optimal full coordinate frame is an orientation associated with the image that has said longest apex to mitral valve plane distance.

3. The method of claim 1, further comprising refining the long axis orientation before calculating the short axis direction by tweaking said long axis, acquiring at least one image at each orientation, and measuring a distance from a short axis plane to an apex of the LV in the image, wherein the long axis is selected from an image having a longest distance to the apex.

4. The method of claim 1, wherein finding a center of the LV bloodpool comprises segmenting the LV bloodpool border, and finding the centroid of the LV bloodpool border.

5. The method of claim 1, wherein finding insertion points comprises analyzing an intensity profile change in said sagittal or short axis image.

6. The method of claim 1, wherein acquiring one or more new images of the heart comprises acquiring new scans of said heart.

7. The method of claim 1, wherein acquiring one or more new images of the heart comprises reformatting data from said 3-dimensional image of said heart.

* * * * *